United States Patent [19]

Olsen

[11] Patent Number: 4,719,720
[45] Date of Patent: Jan. 19, 1988

[54] DOOR WICKET OR VIEWING PORT WITH POLARIZING LENS

[76] Inventor: John W. Olsen, 2854 Piedmont, La Crescenta, Calif. 91214

[21] Appl. No.: 881,916
[22] Filed: Jul. 3, 1986
[51] Int. Cl.[4] .............................................. E06B 7/28
[52] U.S. Cl. ..................................................... 49/171
[58] Field of Search ........................... 49/171; 350/407

[56] References Cited

U.S. PATENT DOCUMENTS

| | | | |
|---|---|---|---|
| 1,737,291 | 11/1929 | Bauer | 49/171 X |
| 2,229,594 | 1/1941 | Seiler | 49/171 X |
| 2,262,203 | 11/1941 | Redstone et al. | 49/171 X |
| 2,304,995 | 12/1942 | Frankel | 49/171 |
| 2,491,758 | 12/1949 | Nichols et al. | 49/171 X |
| 2,638,810 | 5/1953 | Berleme | 49/171 X |
| 3,281,965 | 11/1966 | Irwin | 350/407 X |
| 3,521,940 | 7/1970 | Heckman, Jr. | 350/407 X |
| 3,880,496 | 4/1975 | Davidyan et al. | 350/407 |
| 4,202,601 | 5/1980 | Burbo et al. | 350/407 |
| 4,285,577 | 8/1981 | Schuler | 350/407 X |

*Primary Examiner*—Philip C. Kannan
*Attorney, Agent, or Firm*—John E. Wagner

[57] ABSTRACT

A viewing port for doors such as residences including a light polarizing assembly including at least two linear polarized optical elements, one mounted for rotation with respect to the other element(s) to change the viewing port from light passing to light blocking or reduced transmission condition. The light polarizing assembly is located at the inner side of the door and is surrounded by a tapered portion of its mounting toward the outer face to provide undistorted wide angle viewing of the area surrounding the door. In another embodiment of this invention, my viewing port is designed to be integrated into a stained glass window.

4 Claims, 9 Drawing Figures

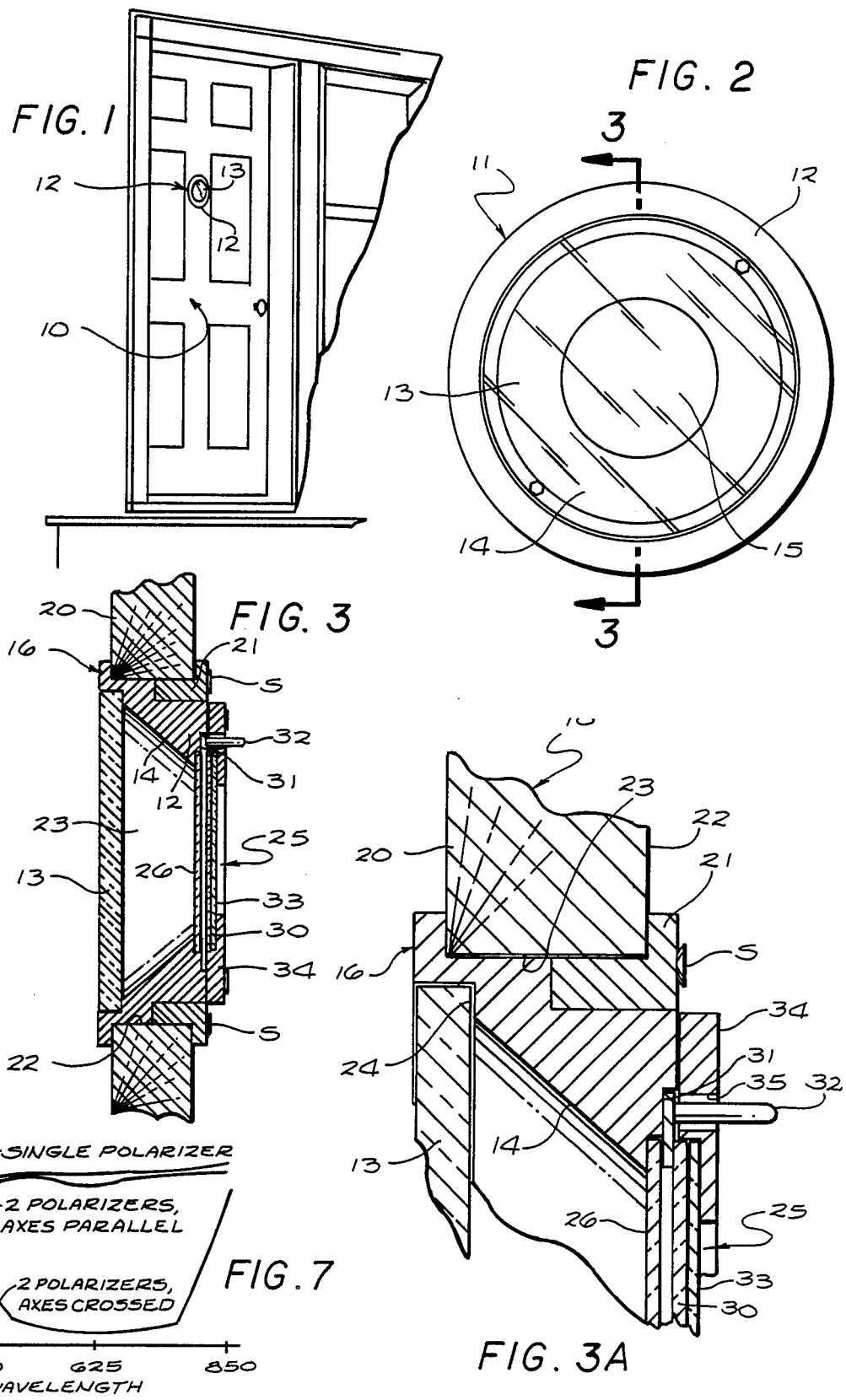

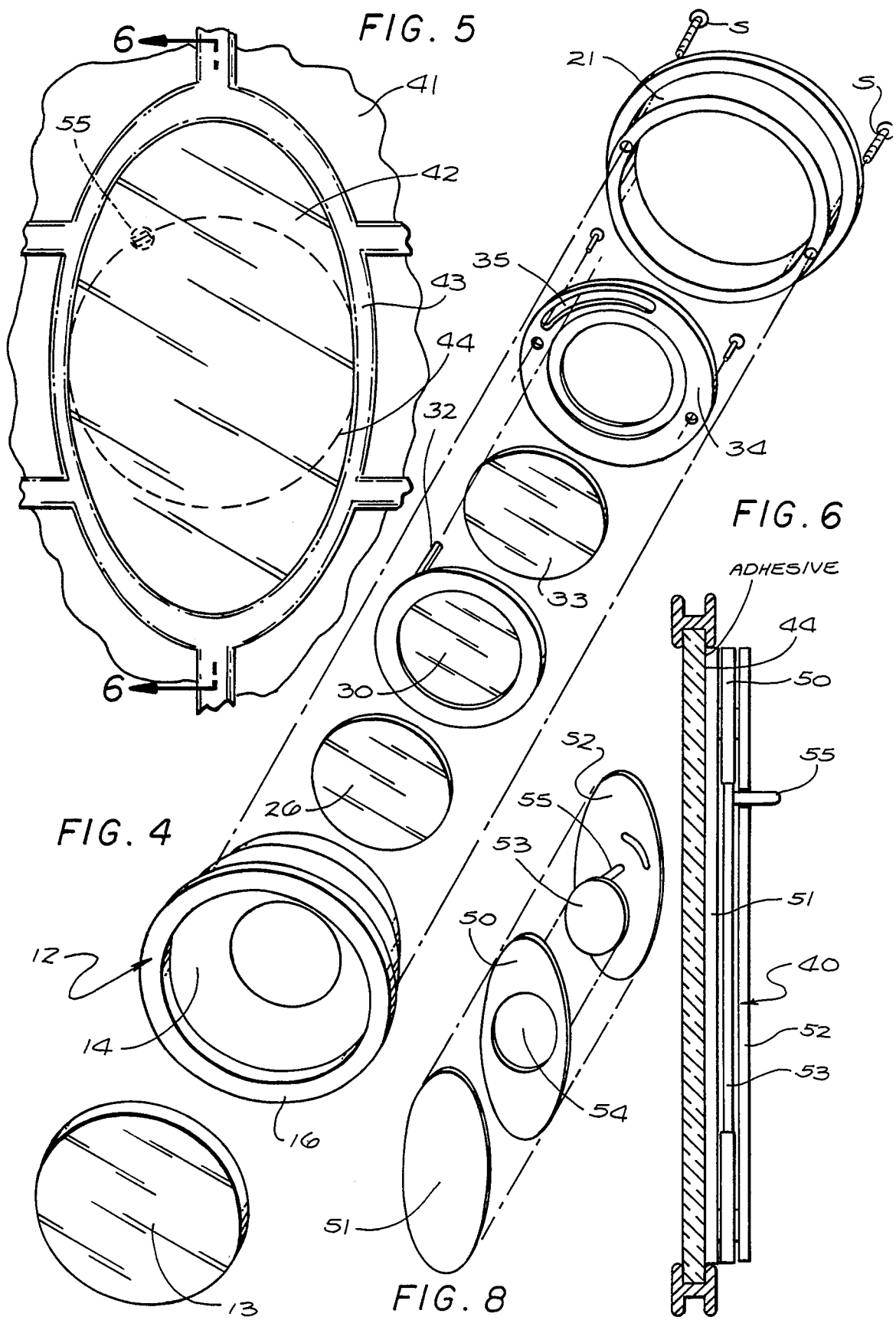

DOOR WICKET OR VIEWING PORT WITH POLARIZING LENS

BACKGROUND OF THE INVENTION

From the earliest days of residences, the use of a peephole allowing the occupants to view the exterior area adjacent of the door has been present. Typically such wickets or peepholes have a small diameter opening through the door and commonly a spherical or "fisheye" lens at the outer side. Such devices allow the occupant to observe the area in front of and around the door and usually maintain a degree of privacy while giving a highly distorted view of the off axis region. Examples of such devices are shown in the following patents:

U.S. Pat. No. 4,561,116, Dec. 24, 1985, Guy Neyret;
U.S. Pat. No. 2,028,108, Jan. 14, 1936, H. Sklar;
U.S. Pat. No. 2,262,203, Nov. 11, 1941, L. G. Redstone et al;
U.S. Pat. No. 2,064,963, Dec. 22, 1936, C. E. Wheeler;
U.S. Pat. No. 2,581,234, Jan. 1, 1952, A. Bloom;
U.S. Pat. No. 2,638,810, May 19, 1953, G. H. Berleme A number of devices have been developed for providing security from view including half silvered mirrors as disclosed in the Neyret patent identified above. In certain cases a shutter has been present on the interior face of the wall, which shutter remains closed at all times except when the occupant desires to view the exterior of the door. An example of such a shutter is shown in the Sklar patent, referenced above. Usually such wickets or peepholes, no matter how well designed, tend to present an unattractive exterior to the door. Likewise wickets or peepholes are usually fully obscured or fully visible but lack any type of control of the quantity of light passing through the optical system.

BRIEF DESCRIPTION OF THE INVENTION

Faced with this state of the art, I felt a need existed for an improved appearance, effective, wicket or viewing port. I also felt that using modern technology, a polarizing lens might be adapted for use in a household wicket and obtain the advantages of polarizing light control in an attractive, effective device.

I therefore designed a wicket for doors which employ a body extending from the interior to the exterior presenting on both the interior and the exterior an attractive appearance. The body mounts two or more polarizing filters with one of the filters subject to change in orientation whereby the two filters constitute a polarizing pair for controlling the light passing through a central opening in the body.

In accordance with this invention, I have in the preferred embodiment, employed three superimposed polarizing filters, two having the same orientation and the third movable and changeable in orientation to provide a polarizing filter assembly. In accordance with one aspect of this invention, the body is circular and includes an attractive tapered outer surface and the central aperture positions the two or three polarizing filters which are circular. The three filters are in spaced stacked array with the central centermost filter rotatable by approximately 90 degrees by manual control to change the polarizing array from full blocking to light passing condition.

In accordance with another aspect of this invention, a polarizing assembly is configured to be attached to or become a part of a stained glass or other window to allow controlled visibility without detracting from the ornamental design of the window.

The net result of each of my embodiments is to produce a large, undistorted viewing area in an opaque surface such as a door with controlled privacy while presenting an attractive appearance.

BRIEF DESCRIPTION OF THE DRAWING

This invention may be more clearly understood from the following detailed description and by reference to the drawing in which:

FIG. 1 is a perspective view of an exterior door incorporating this invention;

FIG. 2 is a front elevational view of this invention;

FIG. 3 is a diametrical section through the wicket or peephole of this invention taken along line 3—3 of FIG. 2;

FIG. 3A is an enlarged fragmentary section of FIG. 3;

FIG. 4 is an exploded view of the wicket of FIG. 2;

FIG. 5 is a front elevational view of an alternate embodiment of this invention adapted to a stained glass window;

FIG. 6 is a diametrical section through the window of FIG. 5 taken along line 6—6 of FIG. 5;

FIG. 7 is a graphical representation of the transmittance characteristics of satisfactory polarizing materials used in this invention; and FIG. 8 is an exploded view of the embodiment of FIGS. 5 and 6.

DETAILED DESCRIPTION OF THE INVENTION

Referring now to FIGS. 1 and 2, a typical exterior residential door 10 appears in FIG. 1 with an ornamental appearing device 11 at approximately eye level and secured in the door 10. The device 11 includes a mounting ring or body 12 and a planar optical surface 13 at the center. An internal tapered wall 14 behind the planar optical surface 13 may be seen in FIG. 2. Beneath the tapered wall 13 is what appears to be an opaque surface 15.

The relationship of these elements is more apparent in the sectional view of FIG. 3 and in more detail. The mounting ring or body 12 includes a lip 16 which engages the outer surface 20 of the door. A matching locking ring 21 engages the inner surface 22 of the door 10. A pair of machine screws S or other fasteners hold the body 12 rigidly within a circular opening 23 in the door 10.

The planar optical surface 13 is, in fact, is a circular window of clear glass resting on a circular shelf 24 enclosing the tapered zone within the device 11.

At the rear of the body 12 is a polarizing assembly 25 made up of a fixed disc 26 of linear polarized optical grade plastic or glass such as the HN32 neutral linear polarizers produced by the Polaroid Corporation of Norwood, Mass. To the rear of the fixed disc 26 is a second linear polarized disc 30 mounted for rotation in a second circular shelf 31. The disc 30 is rotatable by movement in an arcuate path of a handle 32. The details of the assembly 25 are best seen in FIG. 3A.

The polarizing assembly 25 includes, preferably, a third element, linear polarized fixed disc 33. This third element 33 is oriented in the same direction as the polarized disk 26 and secured in place by second locking ring 34. The locking ring 34 has a 90 degree arcuate slot 35, best seen in FIG. 4, through which the handle 32 extends in order to allow the polarizing disc 30 to be rotated from light passing to light blocking relationship through intermediate light level passing relationship. The three linear polarized disks 26, 30 and 33 are optically aligned and positioned in the annular recess defined between the inner side of frame 12 and locking ring 34.

The polarizing assembly 25 allows the householder to have selectively an undistorted view of the area in front and to the sides of the door 10 from the interior of the house. The opening area in the preferred embodiment of this invention is in the order of 3 square inches for the optical elements and 12 square inches for the outer window face area. This size is preferred but my invention is only limited in size to the availability of polarizing sheet material.

The polarizing materials successfully used have the following properties:

| Polaroid HN32 | |
| --- | --- |
| Base material | Plastic |
| Thickness | 0.010 in. |
| Type | Neutral Linear Polarizer |
| Extinction Transmission | 0.005% |
| Percent Transmittance | See Curve FIG. 7 |

The optical transmission characteristics as represented by the manufacturer appears in FIG. 7.

In the case that the outer optical element 13 is half silvered on the front, visibility from the exterior of the door 10 is reduced to practically zero. Visibility from the interior is partially reduced owing to the presence of the half silver layer but the residual light level is controllable by movement of the handle 32.

This invention is not limited to installation in opaque surfaces such as a panel door. A separable polarizing assembly 40 as shown in FIGS. 5, 6 and 8 may be attached to an existing optically transparent or partially transparent surface. In FIGS. 5, 6 and 8, a stained glass window assembly 41 includes a pane 42 held in place by lead strips 43 as is customary. Secured to the rear or inner surface 44 is the polarizing assembly 40 as by adhesive.

The polarizing assembly 40 includes an opaque spacer 50 between two fixed polarized elements 51 and 52 with their linear polarization aligned and a movable linear polarized disc 53. The disc 53 is preferably round and positioned in a circular recess 54 in spacer 50 which optically superimposes the disc 53 on the element 51. The disc 53 is rotatable by 90 degrees by handle 55 similar to handle 32 of FIGS. 3 and 3A so that its axis of polarization is in or out of registration with that of the element 51. This assembly may have various overall dimensions to fit a particular opening size in a stained glass window.

The above described embodiments of this invention are merely descriptive of its principles and are not to be considered limiting. The scope of the present invention instead shall be determined from the scope of the following claims including their equivalents.

What is claimed is:

1. A polarizing assembly for use in an optically transparent window for converting said optically transparent window to selectively light passing and light blocking window comprising:
   a first linear polarized element of size corresponding generally to the size of the portion of the optically transparent window which is desired to remain optically transparent under the control of the user;
   a second linear polarized element;
   means superimposing said second linear polarized element on said first linear polarized element;
   planar means secured to said window and coextensive in size with the portions of said window to be continuously nontransparent for blocking transmission of light through any areas of said optically transparent window outside of the parameter of said second linear polarized element; and
   means for rotating said second linear polarized element to selectively pass and block light transmission through the portion of said second linear polarized element;
   wherein said window comprises a multi-paned stained glass window and said planar light transmission blocking means corresponds in size to one of the panes which is relatively transparent.

2. The combination in accordance with claim 1 in which said means for superimposing said second linear polarized element comprises an opaque spacer having a circular aperture therethrough and wherein said second linear polarized element is circular and dimensioned to fit within the circular aperture in said spacer.

3. The combination in accordance with claim 2 including a third linear polarized element superimposed upon said second linear polarized element; and
   in which said first linear polarized element, said spacer and said third linear polarized element are secured together to confine said second linear polarized element;
   said assembly being substantially the thickness of said linear polarized elements and spacer whereby said combination does not add significantly to the thickness of the window.

4. The combination in accordance with claim 3 in which said first linear polarized element, said spacer and said third linear polarized element are adhesively secured together without a frame; and
   said third linear polarized element includes an arcuate opening therethrough approximating 90 degrees of arc length; and
   include a handle extending through said arcuate opening in said third linear polarized element and engaging said second linear polarized element to allow control of its orientation to control light transmission through said window.

* * * * *